(12) United States Patent
Sharma et al.

(10) Patent No.: US 12,174,400 B2
(45) Date of Patent: Dec. 24, 2024

(54) MULTI-PERSPECTIVE THREE-DIMENSIONAL FLOATING IMAGE DISPLAY

(71) Applicant: GM Global Technology Operations LLC, Detroit, MI (US)

(72) Inventors: Manoj Sharma, Troy, MI (US); Kai-Han Chang, Sterling Heights, MI (US); Thomas A. Seder, Fraser, MI (US); Joseph F. Szczerba, Grand Blanc, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 462 days.

(21) Appl. No.: 17/824,210

(22) Filed: May 25, 2022

(65) Prior Publication Data

US 2023/0384614 A1 Nov. 30, 2023

(51) Int. Cl.
| | |
|---|---|
| *G02B 30/56* | (2020.01) |
| *B60K 35/00* | (2024.01) |
| *G02B 27/00* | (2006.01) |
| *G02B 27/01* | (2006.01) |
| *G02B 27/14* | (2006.01) |
| *B60K 35/60* | (2024.01) |
| *B60K 35/65* | (2024.01) |

(52) U.S. Cl.
CPC ......... *G02B 30/56* (2020.01); *G02B 27/0093* (2013.01); *G02B 27/0101* (2013.01); *G02B 27/14* (2013.01); *B60K 35/00* (2013.01); *B60K 35/60* (2024.01); *B60K 35/656* (2024.01); *B60K 2360/29* (2024.01); *B60K 2360/771* (2024.01)

(58) Field of Classification Search
CPC .. G02B 30/56; G02B 27/0101; B60K 35/211; B60K 35/00; B60K 35/23
See application file for complete search history.

(56) References Cited

U.S. PATENT DOCUMENTS

| | | | |
|---|---|---|---|
| 10,318,043 | B2 | 6/2019 | Seder et al. |
| 11,077,844 | B2 | 8/2021 | Szczerba |
| 2010/0046050 | A1 | 2/2010 | Kroll et al. |
| 2017/0322513 | A1* | 11/2017 | Zapanta ............ G02B 5/32 |
| 2018/0147985 | A1 | 5/2018 | Brown et al. |
| 2019/0243151 | A1 | 8/2019 | Hansen |
| 2021/0023948 | A1 | 1/2021 | Knittl et al. |
| 2023/0039608 | A1 | 2/2023 | Ji et al. |
| 2023/0375829 | A1 | 11/2023 | Seder et al. |

OTHER PUBLICATIONS

United States Patent and Trademark Office. U.S. Appl. No. 17/746,243, filed May 17, 2022.

* cited by examiner

*Primary Examiner* — Ryan D Howard
(74) *Attorney, Agent, or Firm* — Vivacqua Crane, PLLC

(57) ABSTRACT

A system for generating a centrally located floating three-dimensional image display for a plurality of passengers positioned within a vehicle includes a display adapted to project a multiplexed hologram comprising a plurality of three-dimensional holographic images, and a plurality of beam splitters, one beam splitter individually associated with each one of the plurality of passengers, each beam splitter adapted to receive one of the plurality of holographic images from the display and to reflect the one of the plurality of holographic images to the associated one of the plurality of passengers, wherein, each of the plurality of passengers perceives one of the plurality of three-dimensional holographic images floating at a central location within the vehicle.

20 Claims, 4 Drawing Sheets

MULTI-PERSPECTIVE THREE-DIMENSIONAL FLOATING IMAGE DISPLAY

INTRODUCTION

The present disclosure relates to a system for generating a floating image viewable by a plurality of passengers within a vehicle.

Current entertainment systems within vehicles generally comprise a screen or monitor that is mounted within the vehicle for viewing by the passengers. Some systems include smaller individual screens, wherein each passenger has a screen for their personal viewing.

While current systems achieve their intended purpose, there is a need for a new and improved system for providing a floating three-dimensional image that appears centrally located within the vehicle to all the passengers within the vehicle.

SUMMARY

According to several aspects of the present disclosure, a system for generating a centrally located floating three-dimensional image display for a plurality of passengers positioned within a vehicle includes a display adapted to project a multiplexed hologram comprising a plurality of three-dimensional holographic images, and a plurality of beam splitters, one beam splitter individually associated with each one of the plurality of passengers, each beam splitter adapted to receive one of the plurality of holographic images from the display and to reflect the one of the plurality of holographic images to the associated one of the plurality of passengers, wherein, each of the plurality of passengers perceives one of the plurality of three-dimensional holographic images floating at a central location within the vehicle.

According to another aspect, the display is adapted to selectively rotate the projected plurality of three-dimensional holographic images to change the one of the plurality of holographic images received by each of the plurality of beam splitters.

According to another aspect, the plurality of three-dimensional holographic images are pre-computed and encoded into a hologram generator within the display.

According to another aspect, the plurality of three-dimensional holographic images includes a plurality of three-dimensional holographic images of the same three-dimensional object, each three-dimensional holographic image being a different perspective of the three-dimensional object, wherein each passenger perceives a different perspective of the same three-dimensional object, and selective rotation of the multiplexed hologram changes the three-dimensional holographic image and the perspective of the three-dimensional object perceived by each of the passengers.

According to another aspect, each of the plurality of three-dimensional holographic images is a three-dimensional holographic image of a different three-dimensional object, wherein each passenger perceives a different three-dimensional object, and selective rotation of the multiplexed hologram changes the three-dimensional holographic image and the three-dimensional object perceived by each of the passengers.

According to another aspect, the display is mounted to a roof within the vehicle.

According to another aspect, the display is mounted within a floor within the vehicle.

According to another aspect, each of the plurality of beam splitters is transparent, wherein a passenger can see through the beam splitter.

According to another aspect, each of the plurality of beam splitters is moveable between a retracted position and an extended position.

According to another aspect, each of the plurality of beam splitters hangs from a roof of the vehicle.

According to another aspect, each of the plurality of beam splitters is supported from a floor of the vehicle.

According to another aspect, each of the plurality of beam splitters is supported from an armrest within the vehicle.

According to another aspect, an orientation of each of the plurality of beam splitters is fixed.

According to another aspect, an orientation of each of the plurality of beam splitters is adjustable.

According to another aspect, each of the plurality of beam splitters is equipped with head tracking capability, wherein an orientation of each of the plurality of beam splitters changes automatically in response to movement of a head of a passenger.

According to another aspect, each of the plurality of beam splitters has a flat profile.

According to another aspect, each of the plurality of beam splitters has a curved profile.

According to several aspects of the present disclosure, a system for generating a centrally located floating image display for a plurality of passengers positioned within a vehicle includes a display having a hologram generator, the hologram generator including a plurality of pre-recorded three-dimensional holographic images encoded therein, the display adapted to project a multiplexed hologram comprising the plurality of three-dimensional holographic images, and a plurality of transparent beam splitters, one beam splitter individually associated with each one of the plurality of passengers and having one of a flat profile and a curved profile, each of the plurality of beam splitters mounted within the vehicle by one of hanging from a roof of the vehicle, supported from a floor of the vehicle, and supported from an armrest within the vehicle, and each of the plurality of beam splitters moveable between a retracted position and an extended position, wherein, when in the extended position each of the plurality of beam splitters is adapted to receive one of the plurality of holographic images from the display and to reflect the one of the plurality of holographic images to the associated one of the plurality of passengers, wherein, each of the plurality of passengers perceives one of the plurality of three-dimensional holographic images floating at a central location within the vehicle, an orientation of each of the plurality of beam splitters being one of fixed and adjustable, and wherein the display is adapted to selectively rotate the projected multiplexed hologram and the plurality of three-dimensional holographic images to change the one of the plurality of holographic images received by each of the plurality of beam splitters.

According to another aspect, the plurality of holographic images includes one of a plurality of holographic images of the same three-dimensional object, each image being a different perspective of the three-dimensional object, wherein each passenger perceives a different perspective of the same three-dimensional object, and selective rotation of the projected multiplexed hologram changes the three-dimensional holographic image and the perspective of the three-dimensional object perceived by each of the passengers, and a plurality of holographic images, each holographic image of a different three-dimensional object, wherein each passenger perceives a different three-dimensional object, and selective rotation of the projected multiplexed hologram changes the three-dimensional holographic image and the three-dimensional object perceived by each of the passengers.

According to another aspect, an orientation of each of the plurality of beam splitters is adjustable and each of the plurality of beam splitters is equipped with head tracking capability, wherein the orientation of each of the plurality of beam splitters changes automatically in response to movement of a head of a passenger.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
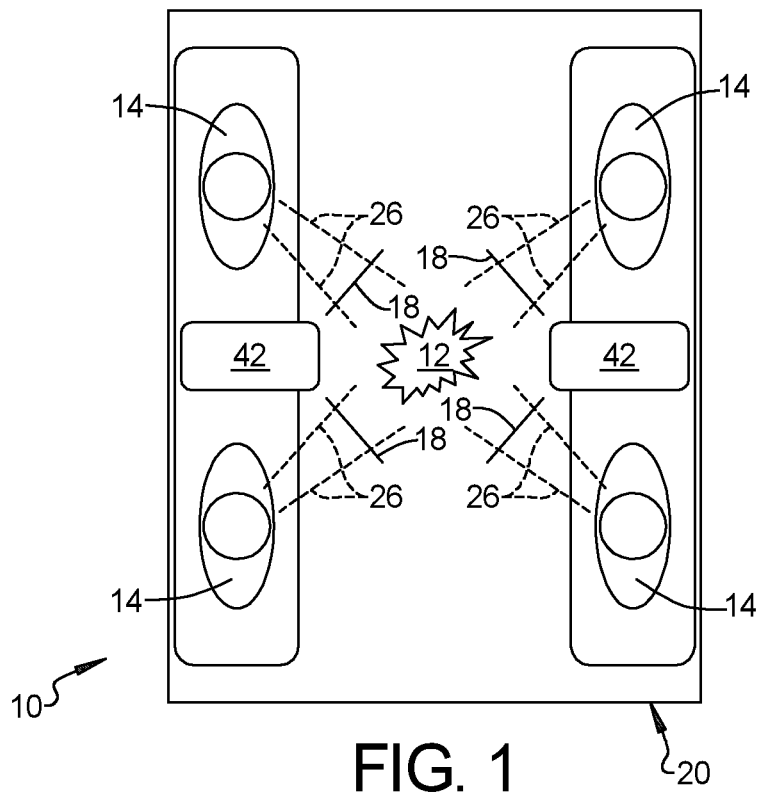
FIG. 1 is a schematic top view of a vehicle compartment having a system in accordance with an exemplary embodiment of the present disclosure.

The figures are not necessarily to scale, and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 2:
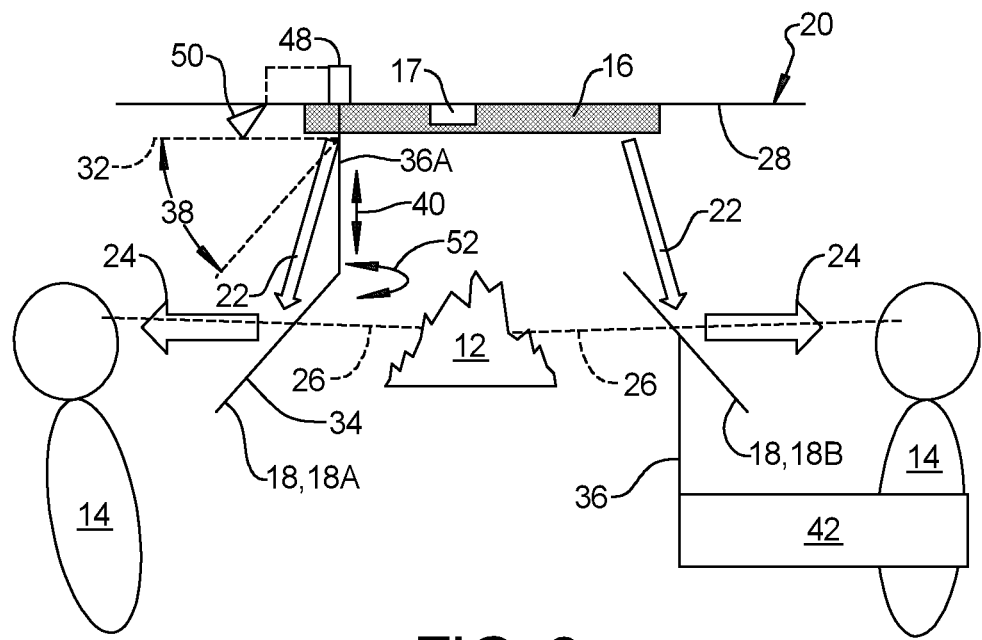
FIG. 2 is a schematic side view of two passengers within a vehicle compartment having a system according to an exemplary embodiment, wherein the display is mounted onto a roof of the vehicle compartment.

Referring to FIG. 1 and FIG. 2, a system 10 for generating a centrally located floating image 12 display for a plurality of passengers 14 positioned within a vehicle, includes a display 16 that is adapted to project a multiplexed hologram comprising a plurality of three-dimensional holographic images and a plurality of beam splitters 18, one beam splitter 18 individually associated with each one of the plurality of passengers 14. The plurality of three-dimensional holographic images are pre-computed and encoded into a hologram generator 17 within the display 16.

Referring to FIG. 1, in an exemplary embodiment, a vehicle compartment 20 includes a plurality of seating positions occupied by a plurality of passengers 14. Each beam splitter 18 is adapted to be viewed by one of the passengers 14. Referring to FIG. 2, the display 16 is adapted to project the plurality of three-dimensional holographic images to one of the plurality of beam splitters 18, as indicated by arrows 22. Each of the plurality of beam splitters 18 is adapted to receive one of the plurality of three-dimensional holographic images from the display 16 and to reflect the one of the plurality of three-dimensional holographic images from the display 16 to one of the plurality of passengers 14, as indicated by arrows 24. Each of the plurality of passengers 14 perceives the floating image 12 at a location centrally located relative to all of the passengers 14, as indicated by lines 26.

In an exemplary embodiment, the display 16 is adapted to project a three-dimensional image with variable virtual image distance. Three-dimensional images with variable virtual image distance allows the system 10 to project a floating image 12 to the passenger 14 with the capability of making the floating image 12 appear closer or further away from the passenger 14.

Referring to FIG. 2, in an exemplary embodiment, the display 16 is mounted to a roof 28 within the vehicle compartment 20. Alternatively, referring to FIG. 3, in another exemplary embodiment, the display 16 is mounted within a floor 30 within the vehicle compartment 20. The display 16 may be mounted directed onto the floor 30 surface of the vehicle compartment 20, or the display 16 may be recessed within the floor 30.

Figure 3:
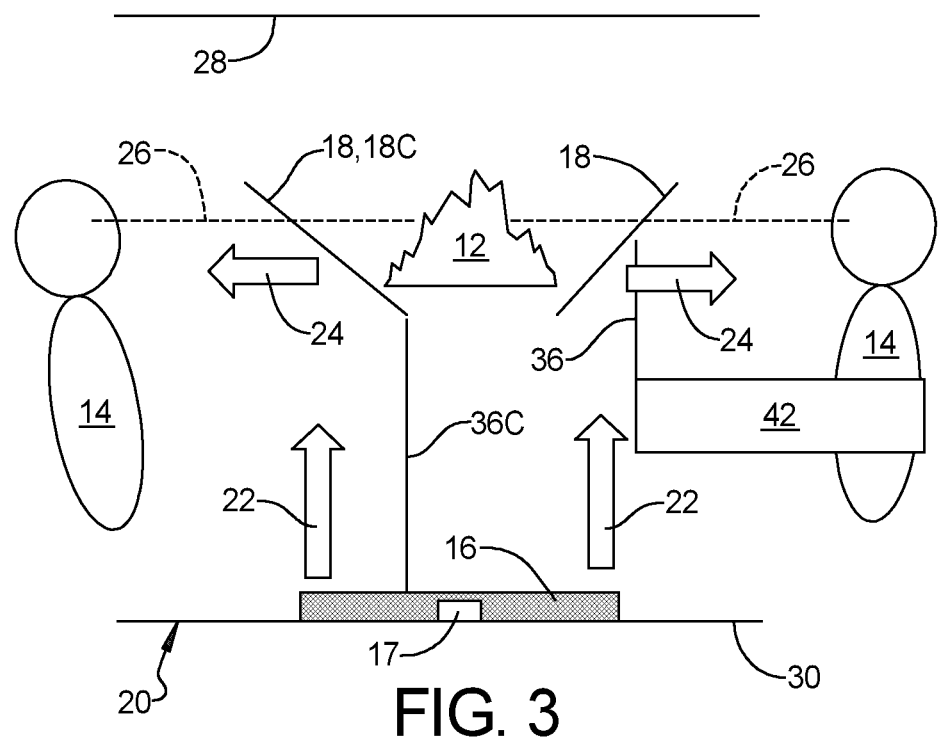
FIG. 3 is a schematic side view of two passengers within a vehicle compartment having a system according to an exemplary embodiment, wherein the display is mounted onto a floor of the vehicle compartment.

Referring to FIG. 2 and FIG. 3, each of the plurality of beam splitters 18 is transparent, wherein a passenger 14 can see through the beam splitter, as indicated at 26. This allows the passenger 14 to perceive the floating image 12 at a distance beyond the beam splitter 18 and further, allows the passenger 14 to see through the beam splitter 18 and able to see the interior of the vehicle compartment 20 and other passengers 14 therein.

Referring to FIG. 2, a beam splitter 18A is shown, wherein the beam splitter 18A is moveable between a retracted position 32 and an extended position 34. In an exemplary embodiment, the beam splitter 18A is mounted onto a support shaft 36A that hangs down from the roof 28 of the vehicle compartment 20. In the retracted position 32, the beam splitter 18A is positioned adjacent to the display 16 and parallel to the roof 28 of the vehicle compartment 20. The beam splitter 18A is pivotal relative to the support shaft 36A, as indicated by arrow 38, and the support shaft 36 is extendable vertically up and down, as indicated by arrow 40. From the retracted position 32, the beam splitter 18A is pivoted down, and the support shaft 36A is extended downward to place the beam splitter 18A in the extended position 34 for use. When in the extended position 34, the beam splitter 18A is in operation proximity to the display 16 and the passenger 14.

Referring again to FIG. 2, a beam splitter 18B is shown, wherein the beam splitter 18B is mounted onto an armrest 42 next to the passenger 14. The beam splitter 18B is attached to a support shaft 36B that is attached to the armrest 42. While not shown, the beam splitter 18B supported on the armrest 42 may also be moveable from a retracted position to an extended position. In one exemplary embodiment, the beam splitter 18B is stowed within the armrest 42 when in the retracted position.

Referring again to FIG. 3, a beam splitter 18C is shown, wherein the beam splitter 18C is mounted onto a support shaft 36C extending upward from the floor 30 of the vehicle compartment 20. While not shown, the beam splitter 18C supported from the floor 30 of the vehicle compartment 20 may also be moveable from a retracted position to an extended position. In one exemplary embodiment, the beam splitter 18C is stowed within the floor 30 of the vehicle compartment 20 when in the retracted position.

Figure 4:
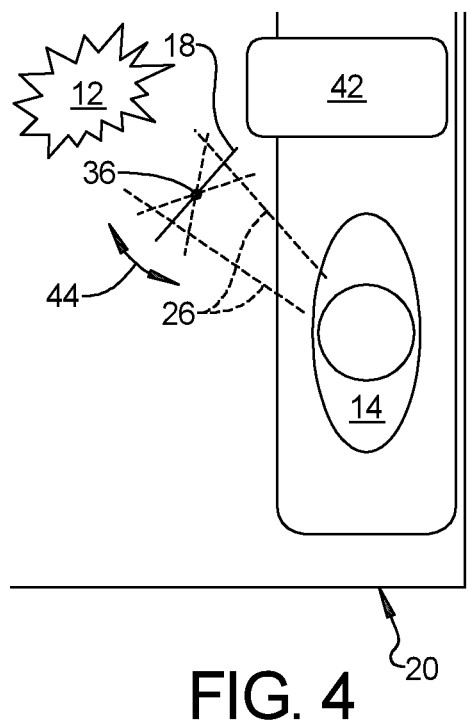
FIG. 4 is a schematic top view of a portion of a vehicle compartment including a beam splitter that is horizontally pivotal.
Figure 5:
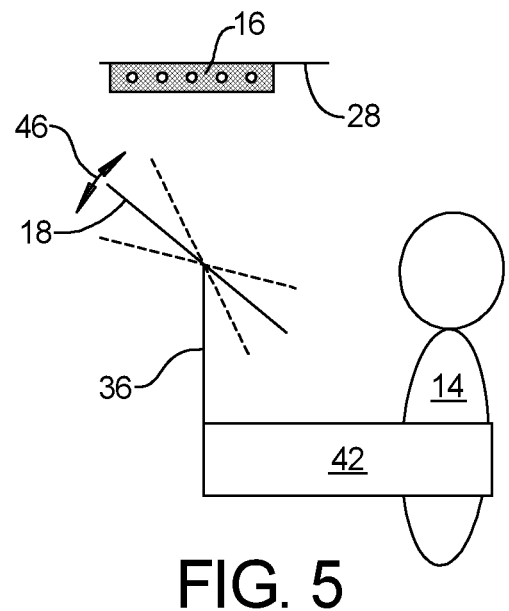
FIG. 5 is a schematic side view of a portion of a vehicle compartment including a beam splitter that is vertically pivotal.

In an exemplary embodiment, an orientation of each of the plurality of beam splitters 18 is fixed. Thus, when the beam splitters 18 are in the extended position 34 angular orientation vertically and horizontally relative to the support shaft 36A, 36B, 36C is fixed. Alternatively, in another exemplary embodiment, an orientation of each of the plurality of beam splitters 18 is adjustable. Referring to FIG. 4, the beam splitter 18 is pivotally mounted onto the support shaft 36 wherein the beam splitter 18 is pivotal horizontally about an axis as shown by arrow 44. Referring to FIG. 5, the beam splitter 18 is pivotally mounted onto the support shaft 36 wherein the beam splitter 18 is vertically pivotal, as indicated by arrow 46. Adjustability of the beam splitter 18 allows the beam splitter 18 to be positioned according to the position of the passenger 14 within the vehicle compartment 20, and according to the height of the passenger 14, ensuring that the system 10 can be customized to accommodate passengers of different size and seating position/orientation preferences. In addition, adjustability of the orientation of the beam splitter 18 allows the perceived location of the floating image 12 to be adjusted according to the passenger's preferences.

In an exemplary embodiment, each of the plurality of beam splitters 18 is equipped with head tracking capability, wherein an orientation of each of the plurality of beam splitters 18 changes automatically in response to movement of a head of a passenger 14. Referring to FIG. 2, the support shaft 36A is attached to a pivotal motor 48 in communication with a driver monitoring system within the vehicle. Driver monitoring systems within a vehicle include cameras that monitor head and eye movement of a driver/passenger within the vehicle. A camera 50 of a driver/passenger monitoring system is mounted within the vehicle compartment 20 and adapted to monitor head and eye movement of the passenger 14. The motor 48 receives information from the camera 50 and in response to detection of head/eye movement by the passenger 14, pivots the support shaft 36A, and the beam splitter 18A, as indicated by arrow 52, to change the orientation of the beam splitter 18A, as indicated by arrow 44 in FIG. 4. Likewise, a motor may be adapted to pivotally change the orientation of the beam splitter 18, as shown in FIG. 5, wherein the motor receives information from the camera 50 of a driver/passenger monitoring system, and in response to detection of head/eye movement by the passenger 14, pivots the beam splitter 18, as indicated by arrow 46 in FIG. 5.

Figure 6A:
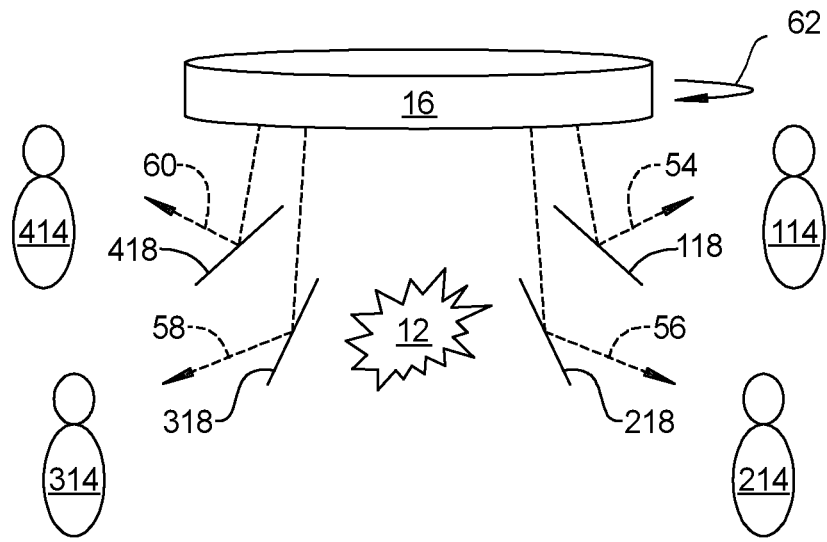
FIG. 6A is a schematic view of a display and four beam splitters reflecting three-dimensional holographic images to four passengers.

In an exemplary embodiment, the display is adapted to selectively rotate the projected multiplexed hologram, and thus, the plurality of three-dimensional holographic images to change the one of the plurality of holographic images received by each of the plurality of beam splitters 18. Referring to FIG. 6A, a schematic view shows a display 16 positioned above first, second, third and fourth beam splitters 118, 218, 318, 418. The display 16 projects a first three-dimensional holographic image to the first beam splitter 118 and to a first passenger 114, as indicated by arrow 54. The display 16 projects a second three-dimensional holographic image to the second beam splitter 218 and to a second passenger 214, as indicated by arrow 56. The display 16 projects a third three-dimensional holographic image to the third beam splitter 318 and to a third passenger 314, as indicated by arrow 58. The display 16 projects a fourth three-dimensional holographic image to the fourth beam splitter 418 and to a fourth passenger 414, as indicated by arrow 60.

Figure 6B:
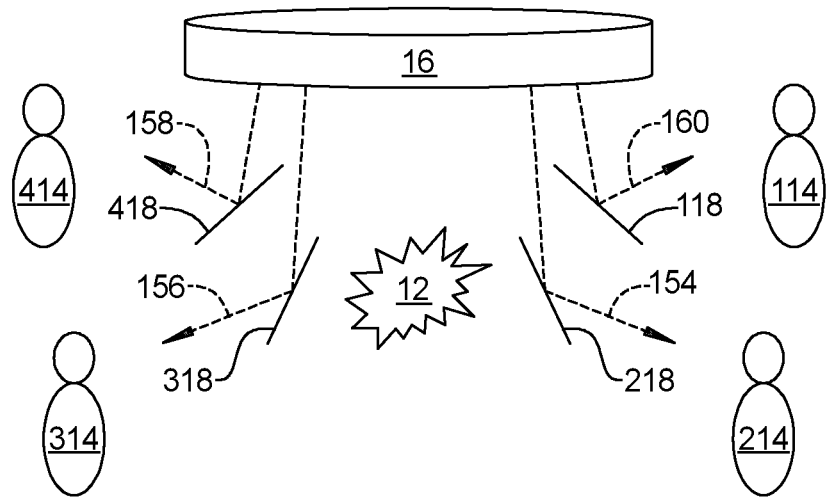
FIG. 6B is the schematic view of FIG. 6A, wherein the projected three-dimensional holographic images have been rotated.

The displayed multiplexed hologram can selectively be rotated to change the three-dimensional holographic image projected to each passenger 114, 214, 314, 414, as indicated by arrow 62. Referring to FIG. 6B, after the displayed multiplexed hologram is rotated, the three-dimensional holographic images are rotated, and the display 16 projects the first three-dimensional holographic image to the second beam splitter 218 and to the second passenger 214, as indicated by arrow 154. The display 16 projects the second three-dimensional holographic image to the third beam splitter 318 and to the third passenger 314, as indicated by arrow 156. The display 16 projects the third three-dimensional holographic image to the fourth beam splitter 418 and to the fourth passenger 414, as indicated by arrow 158. The display 16 projects the fourth three-dimensional holographic image to the first beam splitter 118 and to the first passenger 114, as indicated by arrow 160.

In one exemplary embodiment, the plurality of three-dimensional holographic images includes a plurality of three-dimensional holographic images of the same three-dimensional object 64, each three-dimensional holographic image being a different perspective of the three-dimensional object 64, wherein each passenger 14 perceives a different perspective of the same three-dimensional object 64, and selective rotation of the projected multiplexed hologram changes the three-dimensional holographic image, and thus, the perspective of the three-dimensional object 64 perceived by each of the passengers 14.

Figure 7A:
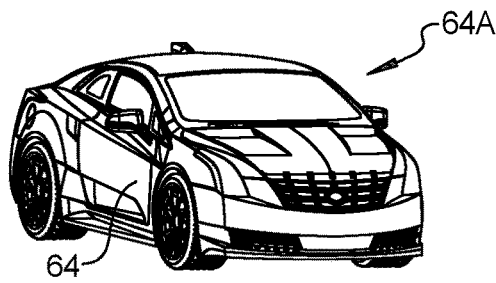
FIG. 7A is a perspective view of a first three-dimensional holographic image wherein the perspective of a three-dimensional object is as viewed from a front right side of the three-dimensional object.
Figure 7B:
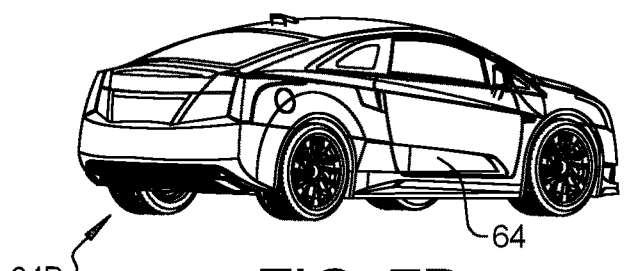
FIG. 7B is a perspective view of a second three-dimensional holographic image wherein the perspective of the three-dimensional object is as viewed from a rear right side of the three-dimensional object.
Figure 7C:
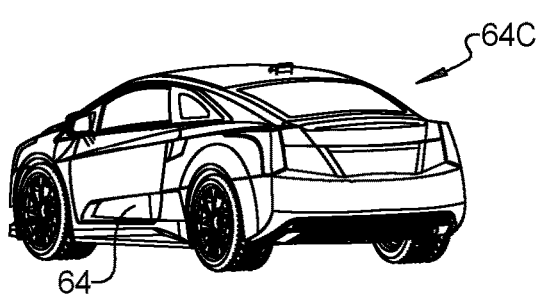
FIG. 7C is a perspective view of a third three-dimensional holographic image wherein the perspective of the three-dimensional object is as viewed from a rear left side of the three-dimensional object.
Figure 7D:
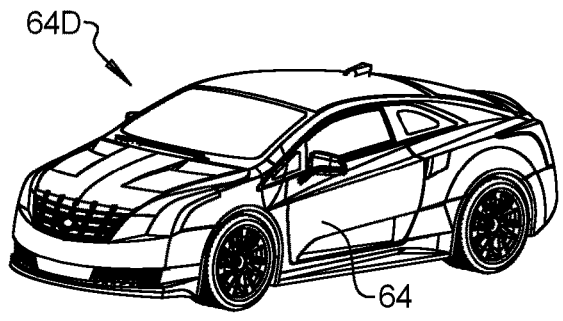
FIG. 7D is a perspective view of a fourth three-dimensional holographic image wherein the perspective of the three-dimensional object is as viewed from a front left side of the three-dimensional object.
Figure 8:
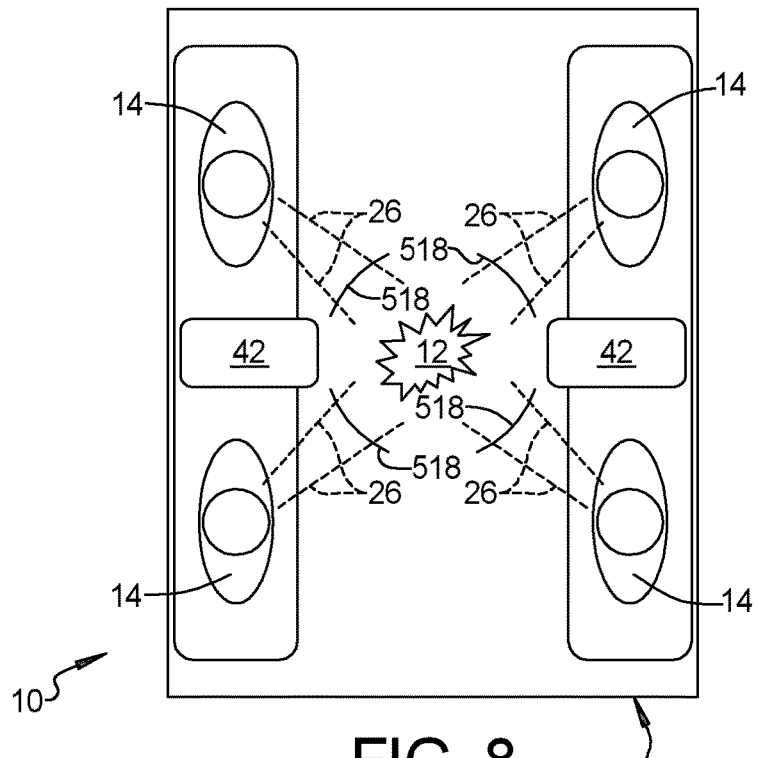
FIG. 8 is a schematic top view of a vehicle compartment having a system in accordance with an exemplary embodiment of the present disclosure, wherein the beam splitters have a curved profile.

Referring again to FIG. 6A and to FIG. 7A, the display 16 projects a first three-dimensional holographic image 64A to the first beam splitter 118 and to the first passenger 114, as indicated by arrow 54. As shown in FIG. 7A, the first three-dimensional holographic image 64A is of a vehicle, wherein the first passenger's 114 perspective of the vehicle is looking at the vehicle from the front right side of the vehicle. Referring again to FIG. 6A and to FIG. 7B, the display 16 projects a second three-dimensional holographic image 64B to the second beam splitter 218 and to the first passenger 114, as indicated by arrow 54. As shown in FIG. 7B, the second three-dimensional holographic image 64B is of the vehicle, wherein the second passenger's 214 perspective of the vehicle is looking at the vehicle from the rear right side of the vehicle. Referring again to FIG. 6A and to FIG. 7C, the display 16 projects a third three-dimensional holographic image 64C to the third beam splitter 318 and to the third passenger 314, as indicated by arrow 54. As shown in FIG. 7C, the third three-dimensional holographic image 64C is of the vehicle, wherein the third passenger's 314 perspective of the vehicle is looking at the vehicle from the rear left side of the vehicle. Referring again to FIG. 6A and to FIG. 7D, the display 16 projects a fourth three-dimensional holographic image 64D to the fourth beam splitter 418 and to the fourth passenger 414, as indicated by arrow 54. As shown in FIG. 7D, the fourth three-dimensional holographic image 64D is of the vehicle, wherein the fourth passenger's 414 perspective of the vehicle is looking at the vehicle from the front left side of the vehicle.

In another exemplary embodiment, each of the plurality of three-dimensional holographic images is a three-dimensional holographic image of a different three-dimensional object, wherein each passenger 14 perceives a different three-dimensional object, and selective rotation of the multiplexed hologram changes the three-dimensional object perceived by each of the passengers 14. This allows the system 10 to present the same floating image 12 to all the passengers 14 so they can view simultaneously, or alternatively, each passenger can view a completely different three-dimensional image.

Referring again to FIG. 1, in an exemplary embodiment the beam splitters 18 have a flat profile. Referring to FIG. 6, in another exemplary embodiment, each of the plurality of beam splitters 518 has a curved profile. Depending on the nature of the plurality of displays 16, and the desired characteristics of the floating image 12, beam splitters 18 having a flat profile or beam splitters 518 having a curved profile can be utilized. Further, the curvature of a curved beam splitter 518 can be varied to further adjust the characteristics of the displayed floating image 12.

A system of the present disclosure offers several advantages. These include providing a floating image that is perceived by the passengers at a centrally location position within the vehicle compartment. This provides a camp-fire like viewing atmosphere where the passengers can all view a common floating image, or each passenger can view a unique floating image.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for generating a centrally located floating three-dimensional image display for a plurality of passengers positioned within a vehicle, comprising:
    a display adapted to project a multiplexed hologram comprising a plurality of three-dimensional holographic images; and
    a plurality of beam splitters, one beam splitter individually associated with each one of the plurality of passengers;
    each beam splitter adapted to receive one of the plurality of holographic images from the display and to reflect the one of the plurality of holographic images to the associated one of the plurality of passengers, wherein each of the plurality of passengers perceives one of the plurality of three-dimensional holographic images floating at a central location within the vehicle.

2. The system of claim 1, wherein the display is adapted to selectively rotate the projected plurality of three-dimensional holographic images to change the one of the plurality of holographic images received by each of the plurality of beam splitters.

3. The system of claim 2, wherein the plurality of three-dimensional holographic images are pre-computed and encoded into a hologram generator within the display.

4. The system of claim 3, wherein the plurality of three-dimensional holographic images includes a plurality of three-dimensional holographic images of the same three-dimensional object, each three-dimensional holographic image being a different perspective of the three-dimensional object, wherein each passenger perceives a different perspective of the same three-dimensional object, and selective rotation of the multiplexed hologram changes the three-dimensional holographic image and the perspective of the three-dimensional object perceived by each of the passengers.

5. The system of claim 3, wherein each of the plurality of three-dimensional holographic images is a three-dimensional holographic image of a different three-dimensional object, wherein each passenger perceives a different three-dimensional object, and selective rotation of the multiplexed hologram changes the three-dimensional holographic image and the three-dimensional object perceived by each of the passengers.

6. The system of claim 3, wherein the display is mounted to a roof within the vehicle.

7. The system of claim 3, wherein the display is mounted within a floor within the vehicle.

8. The system of claim 3, wherein each of the plurality of beam splitters is transparent, wherein a passenger can see through the beam splitter.

9. The system of claim 3, wherein each of the plurality of beam splitters is moveable between a retracted position and an extended position.

10. The system of claim 3, wherein each of the plurality of beam splitters hangs from a roof of the vehicle.

11. The system of claim 3, wherein each of the plurality of beam splitters is supported from a floor of the vehicle.

12. The system of claim 3, wherein each of the plurality of beam splitters is supported from an armrest within the vehicle.

13. The system of claim 3, wherein an orientation of each of the plurality of beam splitters is fixed.

14. The system of claim 3, wherein an orientation of each of the plurality of beam splitters is adjustable.

15. The system of claim 3, wherein each of the plurality of beam splitters is equipped with head tracking capability, wherein an orientation of each of the plurality of beam splitters changes automatically in response to movement of a head of a passenger.

16. The system of claim 3, wherein each of the plurality of beam splitters has a flat profile.

17. The system of claim 3, wherein each of the plurality of beam splitters has a curved profile.

18. A system for generating a centrally located floating image display for a plurality of passengers positioned within a vehicle, comprising:
  a display having a hologram generator, the hologram generator including a plurality of pre-recorded three-dimensional holographic images encoded therein, the display adapted to project a multiplexed hologram comprising the plurality of three-dimensional holographic images; and
  a plurality of transparent beam splitters, one beam splitter individually associated with each one of the plurality of passengers and having one of a flat profile and a curved profile;
  each of the plurality of beam splitters mounted within the vehicle by one of hanging from a roof of the vehicle, supported from a floor of the vehicle, and supported from an armrest within the vehicle, and each of the plurality of beam splitters moveable between a retracted position and an extended position, wherein, when in the extended position each of the plurality of beam splitters is adapted to receive one of the plurality of holographic images from the display and to reflect the one of the plurality of holographic images to the associated one of the plurality of passengers, wherein, each of the plurality of passengers perceives one of the plurality of three-dimensional holographic images floating at a central location within the vehicle, an orientation of each of the plurality of beam splitters being one of fixed and adjustable; and
  wherein the display is adapted to selectively rotate the projected multiplexed hologram and the plurality of three-dimensional holographic images to change the one of the plurality of holographic images received by each of the plurality of beam splitters.

19. The system of claim 18, wherein the plurality of holographic images includes one of:
  a plurality of holographic images of the same three-dimensional object, each image being a different perspective of the three-dimensional object, wherein each passenger perceives a different perspective of the same three-dimensional object, and selective rotation of the projected multiplexed hologram changes the three-dimensional holographic image and the perspective of the three-dimensional object perceived by each of the passengers; and
  a plurality of holographic images, each holographic image of a different three-dimensional object, wherein each passenger perceives a different three-dimensional object, and selective rotation of the projected multiplexed hologram changes the three-dimensional holographic image and the three-dimensional object perceived by each of the passengers.

20. The system of claim 18, wherein an orientation of each of the plurality of beam splitters is adjustable and each of the plurality of beam splitters is equipped with head tracking capability, wherein the orientation of each of the plurality of beam splitters changes automatically in response to movement of a head of a passenger.

* * * * *